United States Patent

Mojden et al.

[11] Patent Number: 5,372,245
[45] Date of Patent: Dec. 13, 1994

[54] AUXILIARY DRIVE FOR AN ARTICLE FEEDER DEVICE

[75] Inventors: Daniel R. Mojden, Clarendon Hills; Miroslav W. Vejchoda, Downers Grove, both of Ill.

[73] Assignee: Fleetwood Systems, Inc., Countryside, Ill.

[21] Appl. No.: 68,060

[22] Filed: May 27, 1993

[51] Int. Cl.$^5$ ............................................. B65G 15/14
[52] U.S. Cl. .................................. 198/604; 198/624; 414/798.4
[58] Field of Search ............... 198/604, 606, 607, 611, 198/624, 817, 836.1, 836.2, 408, 457, 576, 638, 642; 414/788.2, 795.6, 798.4, 798.9

[56] References Cited

U.S. PATENT DOCUMENTS

| | | | |
|---|---|---|---|
| 2,438,811 | 3/1948 | Le Sage | 198/604 |
| 2,935,919 | 5/1960 | O'Neil | 198/611 |
| 3,417,853 | 12/1968 | Mojden et al. | 198/22 |
| 3,595,372 | 7/1971 | Mojden | 198/37 |
| 3,976,254 | 8/1976 | Hench et al. | 198/624 |
| 4,364,466 | 12/1982 | Mojden | 414/798.6 |
| 4,938,649 | 7/1990 | Horst et al. | 198/607 |

*Primary Examiner*—Joseph E. Valenza
*Attorney, Agent, or Firm*—Trexler, Bushnell, Giangiorgi & Blackstone, Ltd.

[57] ABSTRACT

An auxiliary drive apparatus is provided for a motorized feeder device for propelling a flow of articles such as can ends in a facewise nested condition from a first location to a second location. The feeder device includes belts engaging the articles and a drive for driving the belts to propel the articles. The auxiliary drive apparatus comprises a power take-off coupled to the drive, an article propelling assembly located and configured for engaging and propelling the articles in a direction from the first location to the second location, and a power transmitting assembly operatively coupled intermediate the power take-off and the article propelling assembly for driving the article propelling assembly in a manner for cooperating with the belts for propelling the articles from the first location to the second location.

16 Claims, 3 Drawing Sheets

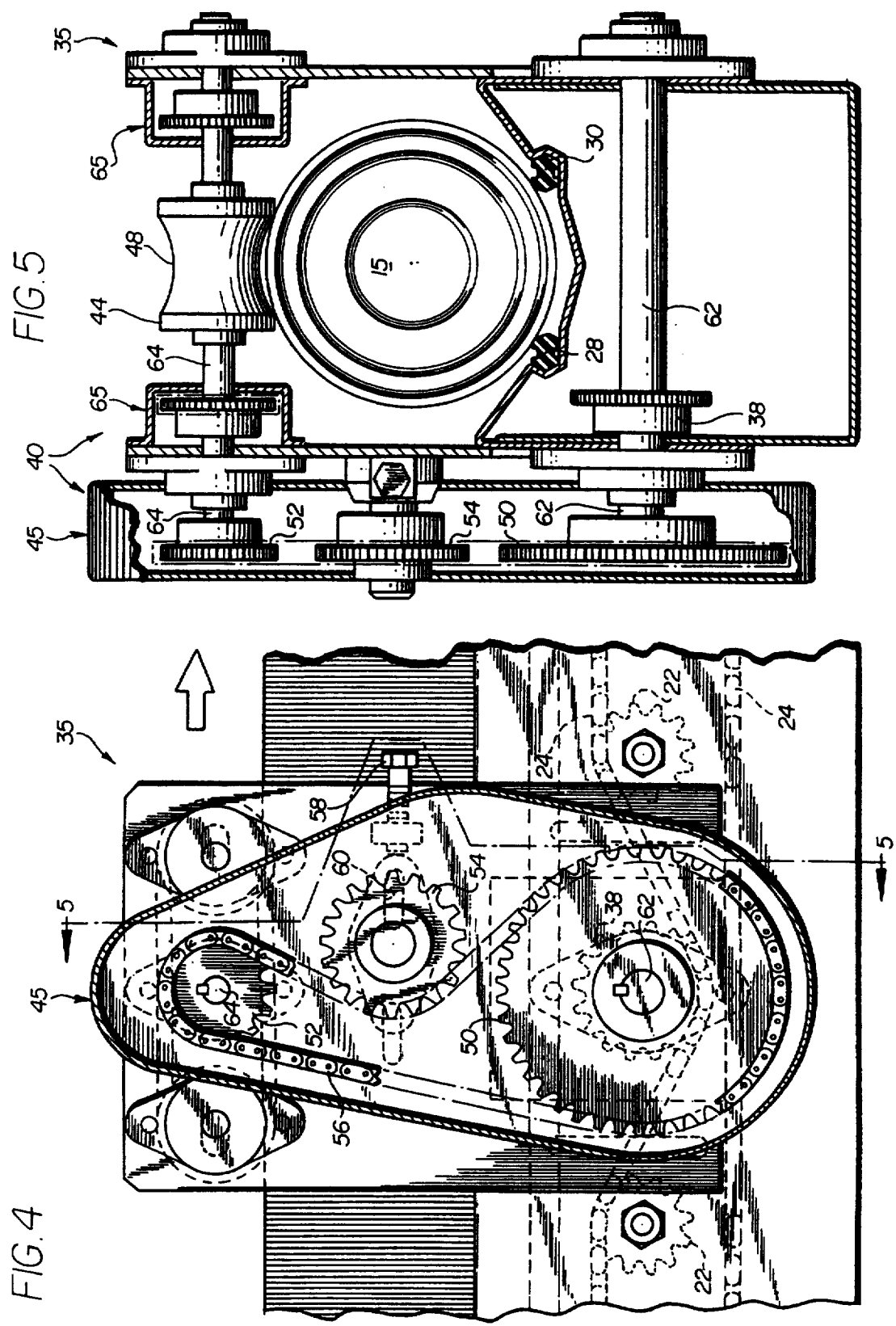

AUXILIARY DRIVE FOR AN ARTICLE FEEDER DEVICE

BACKGROUND OF THE INVENTION

This invention is directed to improvements in a motorized end feed device for propelling a flow of articles such as can ends in a facewise nested condition. More particularly, the invention relates to a auxiliary drive apparatus for assisting the motorized end feed in propelling the articles.

While the invention may find other useful applications, the invention will be particularly described herein with reference to the problem of propelling or feeding a flow of can ends in a facewise nested condition from a first location to a second location. Various feeder apparatus and devices are utilized in can end fabricating and handling operations to deliver an essentially continuous flow of can ends in facewise nested condition between one point or station and another point or station in a can end fabricating operation, or similarly, in a packaging operation wherein the can ends are to be assembled with filled can bodies to form closures.

One particular problem which arises is that of propelling or delivering the can ends from a location at one vertical level to a location which is at a somewhat higher vertical level. A motorized feeder device has been developed for this purpose which utilizes a motor-driven chain drive for rotating a pair of endless members in the nature of flexible urethane belts or the like, which in turn directly engage and propel the nested can ends. Generally speaking, a pair of spaced apart urethane belts are entwined over a series of sheaves or pulleys which define a generally horizontal path or track as well as any inclined portion of the track. The nested can ends are carried atop these two belts which are generally symmetrically located for engaging spaced apart points of bottom or downwardly facing edges of the can ends. Additional guide rails or guard rails may be provided above the belts to slidably engage one or more additional points about the surface of the can ends located above their points of engagement with the belts, in order to maintain the can ends in place upon the belts and along the conveyor or feeder device defined thereby.

However, it has been found that along upwardly inclined portions of a feeder device or conveyor apparatus of this type, there is sometimes a tendency for some slippage of the can ends to occur relative to the two belts which normally engage and propel the ends. This tendency is particularly noted as the size of the can ends is increased.

Accordingly, the present invention provides a novel and improved auxiliary drive apparatus for use with a motorized feeder device of the above-described type. This auxiliary drive apparatus is preferably coupled to a portion of the motorized endfeed device slightly downstream of an incline in order to provide an increased force for propelling the can ends up the incline portion of the end feed device or conveyor.

OBJECTS AND SUMMARY OF THE INVENTION

Accordingly, it is a general object of this invention to provide an auxiliary drive apparatus for a motorized feeder device for propelling a flow of articles such as can ends in a facewise nested condition.

Briefly, and in accordance with the foregoing objects, an auxiliary drive apparatus is provided for a motorized feeder device for propelling a flow of articles such as can ends in a facewise nested condition from a first location to a second location, said feeder device including belt means engaging said articles and drive means for driving said belt means to propel said articles from said first location to said second location, said auxiliary drive apparatus comprising: power take-off means coupled to said drive means; article propelling means located and configured for engaging and propelling said articles in a direction from said first location to said second location, and power transmitting means operatively coupled intermediate said power take-off means and said article propelling means for driving said article propelling means in a direction for cooperating with said belt means for propelling said articles from said first location to said second location.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 4 is a side elevation of the apparatus of the invention, taken generally in the plane of the line 4—4 of FIG. 3; and FIG. 5 is a developmental view taken generally along the line 5—5 of FIG. 4.

DETAILED DESCRIPTION OF THE ILLUSTRATED EMBODIMENT

Figure 1:
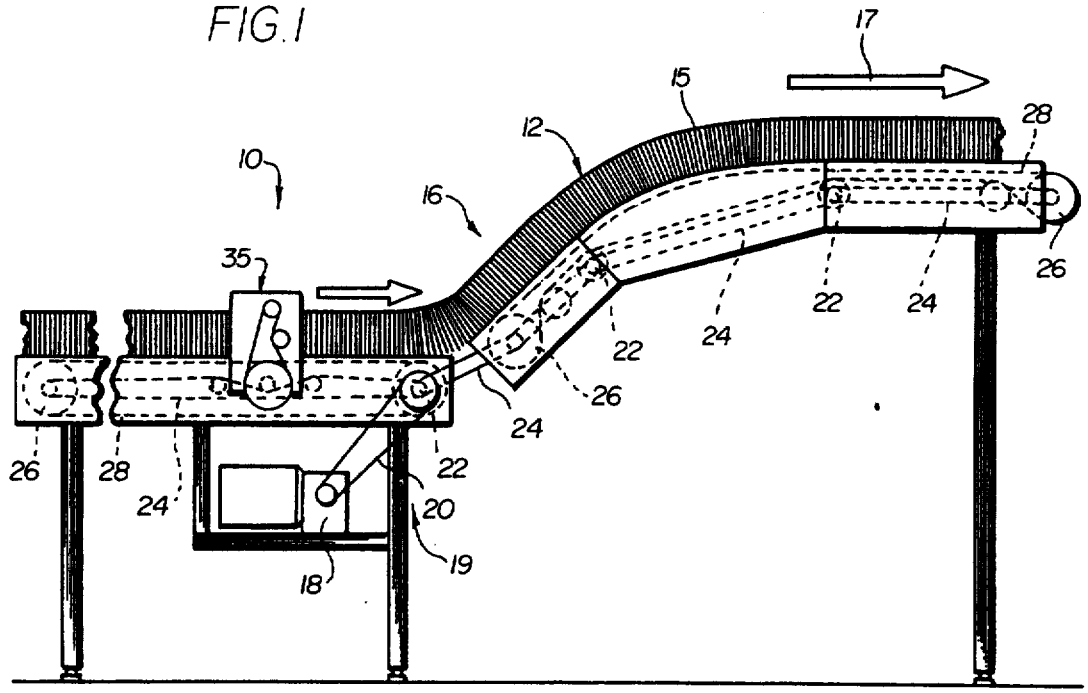
FIG. 1 is a side elevation, partially broken away and somewhat diagrammatic in form, of a motorized feeder device which has been provided with an auxiliary drive apparatus in accordance with the present invention.
Figure 2:
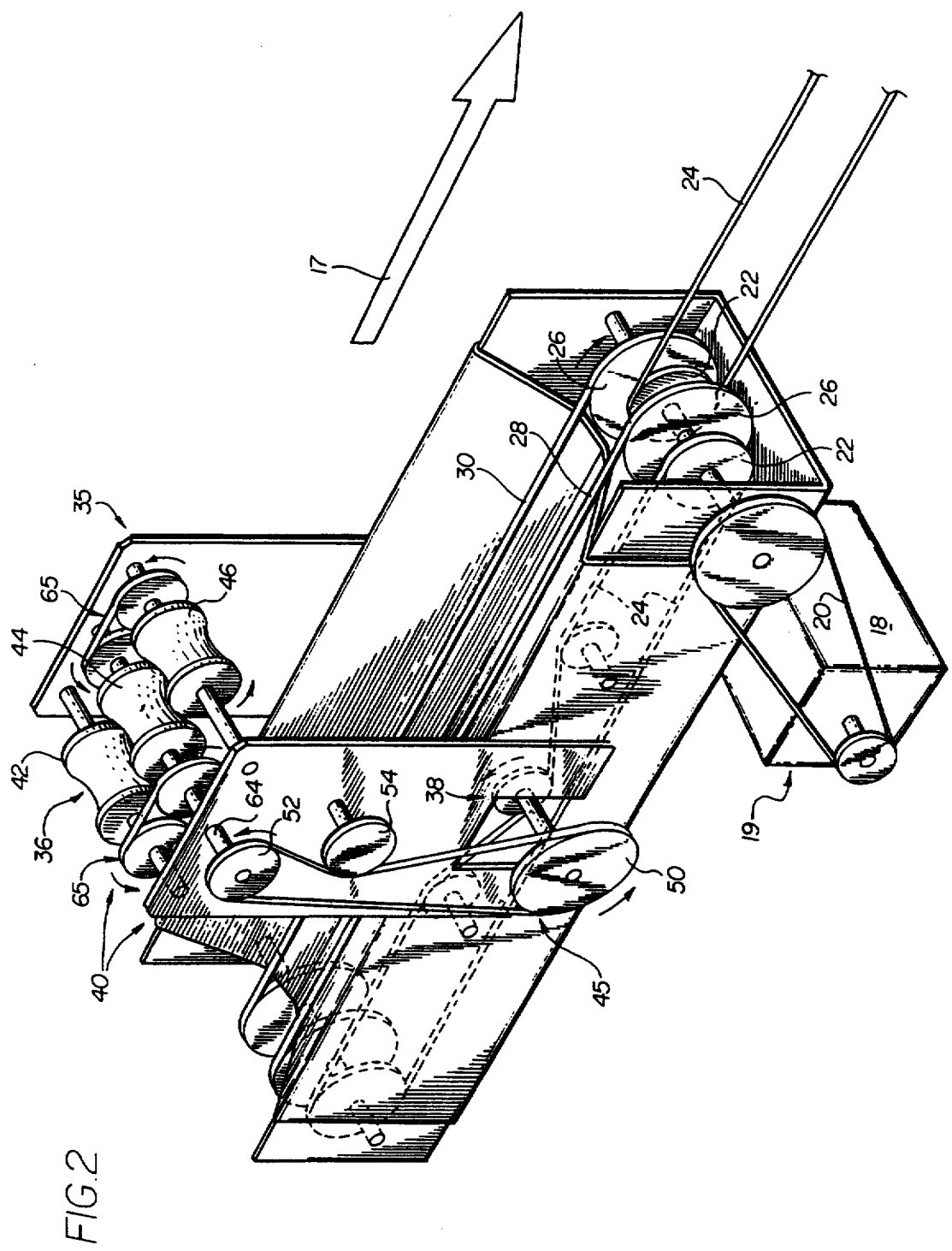
FIG. 2 is a perspective view, somewhat diagrammatic in form, of an auxiliary drive apparatus in accordance with the invention.

Referring now to the drawings and initially to FIGS. 1 and 2, there is illustrated a motorized feeder device 10 for propelling a group or flow 12 of articles 15 such as can ends in a facewise nested condition from a first location at one end of the feeder device to a second location at the opposite end of the feeder device, in a direction indicated by arrow 17. It will be noted that the feeder device includes an upwardly inclined portion 16 such that the flow or group of articles are lifted generally from a first or somewhat lower vertical level at one end of the feeder device 10 to a second or somewhat higher vertical level at its second end. Generally speaking, the feeder device employs drive means 19 comprising a motorized drive unit 18 coupled by suitable means, such as a chain diagrammatically indicated at reference numeral 20, to a chain and sprocket drive assembly including sprockets 22 and chains 24, to drive pulleys 26. Entwined around the pulleys 26 are a pair of belts 28, 30, preferably of a flexible urethane or rubber-like material.

In accordance with the invention there is provided an auxiliary drive apparatus 35, preferably located generally at the foot or lower end of the incline 16 for assisting the motor driven belts 28, 30 in propelling articles 15 upwardly over the incline 16 in the direction indicated by the arrow 17 in FIG. 1. Generally speaking, the auxiliary drive apparatus 35 comprises article propelling means 36 for engaging and propelling the articles 15 in a direction from the first location to the second location, that is, the direction indicated by the arrow 17 in FIGS. 1 and 2. The auxiliary drive apparatus 35 further includes power take-off means 38 coupled to the drive means 19 and power transmitting means 40 operatively coupled intermediate the power take-off means 38 and the article propelling means 36. The power transmitting means 40 is arranged and configured for driving the article propelling means 36 in a direction for cooperating with the belts 28 and 30 for propelling the articles from the first location to the second location in the direction located by the arrow 17 in FIGS. 1 and 2.

Figure 3:
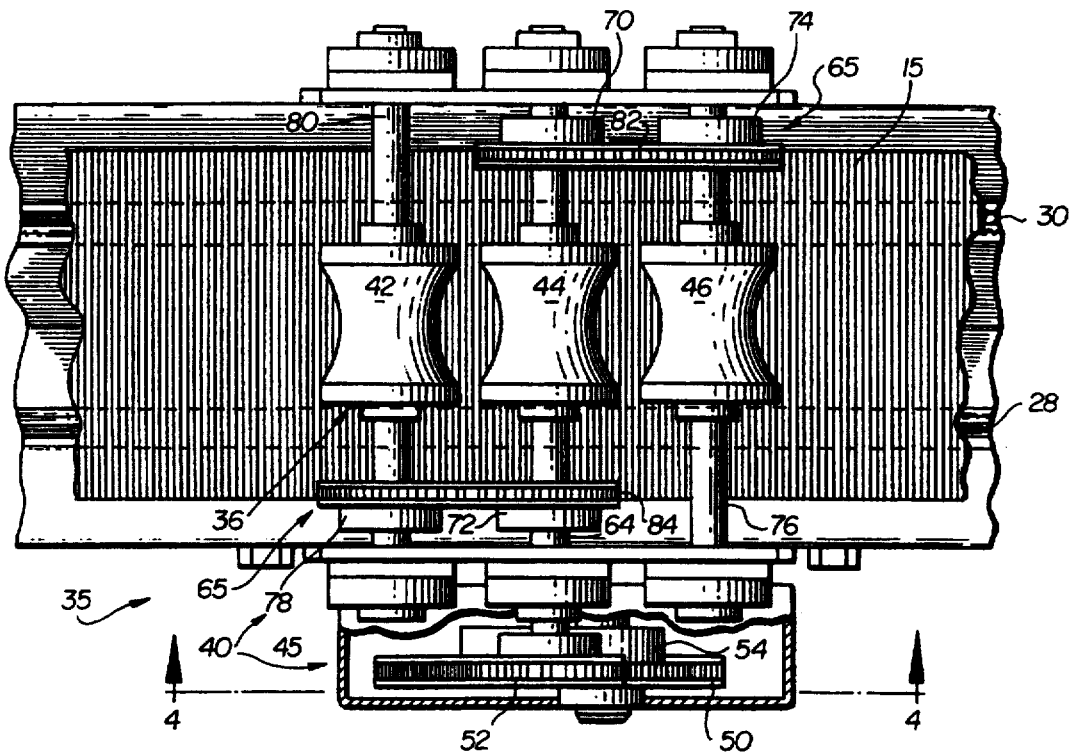
FIG. 3 is a top plan view of the apparatus of the invention.

Referring now also to FIGS. 3, 4 and 5, it will be seen that the article propelling means 36 comprise at least one, and in the illustrated embodiment, three (3) roller members 42, 44 and 46 which are located and configured for engagement with an outer edge surface portion of the articles or can ends 15. In this regard, each of the rollers has an article engaging surface 48 of complementary form with the surface of the article such as can end 15 to be engaged thereby and is preferably formed from a relatively hard rubber-like or urethane material as best viewed in FIG. 5. In the illustrated embodiment, surface 48 is concave in configuration and is generally complementary in form with a facing convex edge surface of the articles or cans 15.

As best viewed in FIGS. 4 and 5, the power take-off means 38 comprises a rotatable member, preferably a sprocket, which is located and configured for engagement by the drive means for the feeder device, and specifically with the chain 24 of the drive means. The power transmitting means 40 comprises a speed adjusting transmission means 45 for controlling the effective linear velocity of the article propelling means 36 so that this effective linear velocity is substantially equal to the effective linear velocity of the belts 28, 30 of the feeder device. Thus, the article propelling means 36 and specifically rollers 42, 44 and 46 are imparted an effective velocity by the speed adjusting transmission means 40 to cooperate with the belts 28 and 30 in advancing the articles in the direction indicated by the arrow 17 in FIGS. 1 and 2.

The transmission means 45 includes a plurality of rotatable members, preferably sprockets, 50, 52 and 54 and at least one closed elongate flexible member, preferably a chain 56, which is looped about and in operative engagement with the rotatable members or sprockets 50, and 52. An additional tension adjusting member 58 may be provided in connection with a further rotatable member or sprocket 54 which serve as an idler. Sprocket 54 is mounted for variable positioning relative to a slot 60 under the control of tensioning member or bolt 58, to adjust the amount of tension on the endless member or chain 56. The first sprocket 50 is mounted for rotation in unison with the power take-off means or sprocket 38. That is, the two are mounted to a common shaft 62. The rotatable member or sprocket 52 is coupled to drive the article propelling means or rollers 42, 44 and 46. Specifically, sprocket 52 is coupled to rotate in unison with roller 44 by means of being coupled to a common shaft 64 therewith.

In this regard, the power transmitting means 40 further includes coupling means, designated generally by reference numeral 65 for operatively coupling the rollers 42, 44 and 46 to rotate in unison. In the illustrated embodiment, the coupling means 65 comprises further rotatable members, preferably chains, preferably sprockets 72, 74 and 78 and flexible members, preferably chains 82 and 84. Sprockets 70, 72 are mounted to the shaft 64 to rotate in unison with roller 44. Cooperatively, sprocket 74 is coupled to a common shaft 76 with roller 46 and similarly, sprocket 78 is coupled to a shaft 80 to rotate in unison with roller 42. Accordingly, respective flexible members or chains 82, 84 respectively loop about and operatively engage the respective pairs of sprockets 70, 74 on the one hand and 72, 78 on the other hand. It will be noted that the placement of these sprockets and chains is such to impart the same rotative sense or direction of motion to each of the rollers 42 and 46 from the roller 44 at its drive shaft 64, which is driven from sprocket 52 of the transmission 40.

Accordingly, what has been shown and described herein is an auxiliary drive apparatus 35 which utilizes a power take-off 38 rotated by chains 24 which drive the feeder device 10 to energize a transmission 45. The transmission 45 in turn drives a coupling assembly 65 so as to cause the rotation of auxiliary article propelling means or rollers 42, 44, 46 and adjusts the rotational speed thereof to have the same effective linear velocity as the linear velocity of belts 28 and 30 of the feeder device. This assures that both belts 28 and 30 and the propelling means or rollers 42, 44 and 46 will engage and propel or advance the articles or can ends 15 at substantially the same velocity.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. An auxiliary drive apparatus for a motorized feeder device for transporting a flow of articles such as can ends in a facewise nested condition up an incline from a first location to a second location, said feeder device including a plurality of belts for engaging an outer edge of said articles to one side of said articles and transporting said articles, a plurality of pulleys for driving said belts, a motor, and drive means operatively coupling said motor for rotating at least one of said pulleys for driving said belts to transport said articles from said first location to said second location, said auxiliary drive apparatus comprising: a rotatable power take-off member located and configured for engagement by said drive means to be driven thereby; an article propelling roller located and configured for engagement with said outer edge of some of said articles to a side of said articles generally opposite said one side engaged by said belts and simultaneously with the engagement of said articles by said belts, for propelling said articles in the same direction as said belts; and a speed adjusting transmission operatively coupled intermediate said power take-off member and said article propelling roller for driving said article propelling roller and for controlling the effective linear velocity of said article propelling roller so as to substantially equal the effective linear velocity of said belts; such that in operation some of the articles in said flow of articles are engaged between and propelled by both said belts and said article propelling roller simultaneously.

2. Apparatus according to claim 1 wherein said speed adjusting transmission comprises a second rotatable member coupled to rotate in unison with said power take-off rotatable member, a third rotatable member coupled to drive said article propelling roller, and a closed elongate flexible member looped about and in operative engagement with said second and third rotatable members.

3. Apparatus according to claim 1 and further including a plurality of additional article propelling rollers located and configured for engagement with said articles, and coupling means for operatively coupling said plurality of article propelling rollers to rotate in unison.

4. Apparatus according to claim 3 wherein said coupling means comprises a further rotatable member operatively coupled to each of said article propelling rollers and a plurality of closed elongate flexible members engaged with and operatively interconnecting selected ones of said further rotatable members.

5. Apparatus according to claim 4 wherein each said rotatable member comprises a sprocket and wherein each of said closed elongate flexible members comprises a chain configured for complementary engagement with operatively associated ones of said sprockets.

6. Apparatus according to claim 1 wherein said article propelling roller has an article engaging surface of complementary form with the surface of an aritcle to be engaged thereby.

7. Apparatus according to claim 3 wherein each of said article propelling rollers has an article engaging surface of complementary form with the surface of an article to be engaged thereby.

8. Apparatus according to claim 7 wherein each of said article propelling rollers is formed of a urethane material.

9. An improved motorized feeder device for propelling a flow of articles such as can ends in a facewise nested condition up an incline from a first location to a second location, said feeder device comprising: a plurality of belts for engaging an outer edge of said articles to one side of said articles and transporting said articles, a plurality of pulleys for driving said belts, a motor, drive means coupling said motor for rotating at least one of said pulleys for driving said belts to propel said articles from said first location to said second location, and an auxiliary drive apparatus comprising a rotatable power take-off member located and configured for engagement by said drive means to be driven thereby; an article propelling roller located and configured for engagement with said outer edge of some of said articles to a side of said articles generally opposite said one side engaged by said belts and simultaneously with the engagement of said articles by said belts, for propelling said articles in the same direction as said belts; and a speed adjusting transmission operatively coupled intermediate said power take-off member and said article propelling roller for driving said article propelling roller and for controlling the effective linear velocity of said article propelling roller so as to substantially equal the effective linear velocity of said belts; such that in operation some of the articles in said flow of articles are engaged between and propelled by both said belts and said article propelling roller simultaneously.

10. A device according to claim 9 wherein said speed adjusting transmission comprises a second rotatable member coupled to rotate in unison with said power take-off rotatable member, a third rotatable member coupled to drive said article propelling rollers, and a closed elongate flexible member looped about and in operative engagement with said second and third rotatable members.

11. A device according to claim 9 and further including a plurality of additional article propelling rollers located and configured for engagement with said articles, and coupling means for operatively coupling said plurality of article propelling rollers to rotate in unison.

12. A device according to claim 3 wherein said coupling means comprises a further rotatable member operatively coupled to each of said article propelling rollers and a plurality of closed elongate flexible members engaged with and operatively interconnecting selected ones of said further rotatable members.

13. A device according to claim 12 wherein each said rotatable member comprises a sprocket and wherein each of said closed elongate flexible members comprises a chain configured for complementary engagement with operatively associated ones of said sprockets.

14. A device according to claim 9 wherein said article propelling roller has an article engaging surface of complementary form with with the surface of an article to be engaged thereby.

15. A device according to claim 11 wherein each of said article propelling rollers has an article engaging surface of complementary form with the surface of an article to be engaged thereby.

16. A device according to claim 15 wherein each of said article propelling rollers is formed of a urethane material.

* * * * *